United States Patent Office 3,717,324
Patented Feb. 20, 1973

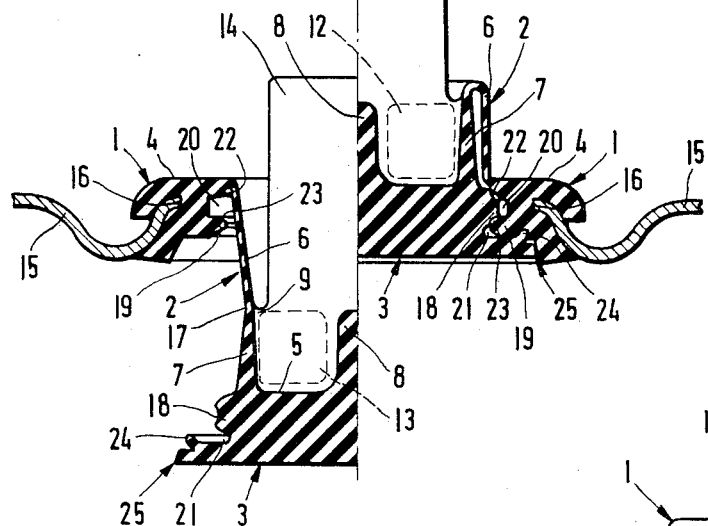
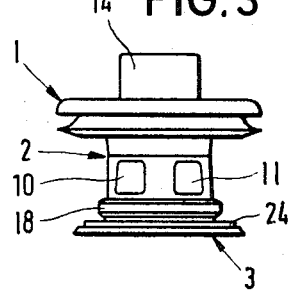
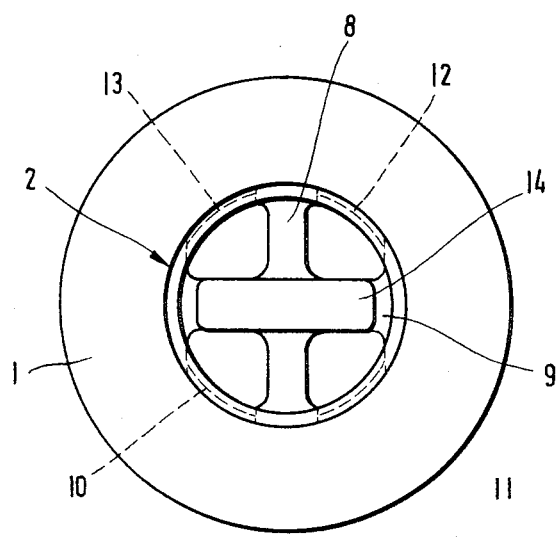

3,717,324
CLOSURE VALVE
Wilhelm Milde, Wolfsburg, Germany, assignor to Volkswagenwerk Aktiengesellschaft, Wolfsburg, Germany
Filed May 14, 1971, Ser. No. 143,517
Int. Cl. F16k 7/20
U.S. Cl. 251—331                 11 Claims

ABSTRACT OF THE DISCLOSURE

A locking arrangement made of flexible material which is insertable in an opening of a plate member, including a flanged portion with an axial bore therein, a cylindrical bellows secured at one end to the flanged portion along the periphery of its axial bore. The bellows has outlet openings to permit a flow axially through the arrangement, and a sealing plate is provided at the other end of the bellows which serves to limit the flow through the arrangement by being movable toward the flanged portion into sealing engagement therewith. The bellows is folded over on itself during such movement so as to permit a circumferential flange provided on the sealing plate to be sealed with said flanged portion.

This invention relates to a locking arrangement made of a flexible material insertable into an opening in a flanged plate member. Such an arrangement may serve as an intake and discharge lock for a motor vehicle which may be inserted into the floorboard thereof. The invention may also be used advantageously for other purposes; for example, whenever a container is to be provided with a lock which is to be opened and thereafter closed tightly. At the same time, the locking arrangement according to the present invention may be used as a lock for liquid containers because of its ability to mainatin close tolerances, as well as a lock for the arbitrary interruption of gas flows.

The present locking arrangement, which is easy to produce, may be inserted into an opening of a flanged plate and, by reason of its simple construction, may be easily serviced. Such locking arrangement has a flanged portion with a groove along its outer periphery for tight insertion into the plate member opening. The flanged portion has an inner periphery along which an axially related bellows is connected defining a flow path for the arrangement, the bellows having exit openings for the flow and lying in its open position within the flanged portion. Also, the bellows is interconnected with a sealing plate which prevents flow when locked and sealed against the flanged portion, the bellows being folded on itself when the sealing plate is moved to a closed position into the inner peripheral area of the flanged portion. When so moved, the exit opening are interrupted and the flow stops.

The flanged portion of the locking arrangement according to the present invention therefore serves to hold the arrangement securely within the bore of a flanged plate member in, for example, the floorboard of a motor vehicle. This flanged portion has an axial bore with a cylindrical bellows secured therealong at one end in axial relationship, the bellows having openings which define the flow paths for a liquid or gas. At the other end of the bellows a sealing plate is provided which is movable to stop the flow by forming a seal together with the flanged portion. The bellows, during movement of the sealing plate and into a closed position, is caused to be inverted or folded over upon itself. The sealing plate has an operating handle thereon inside the bellows which projects outwardly in an axial direction from the flanged portion. Further, the locking arrangement according to the invention may be designed in such a way that it normally will be closed, for example, with the use of spring means or even opened with the assistance of spring means should the sealing plate be subjected to pressure from the outside.

The flanged portion, bellows and sealing plate constitute a single part made of rubber or a rubber-like material. A portion of the bellows wall is sufficiently thin to permit a folding over upon itself during closing of the arrangement. To facilitate this folding over or inversion, which produces an inner and outer cylinder of the bellows, its diameter decreases from its one end in a direction toward the sealing plate. For the same purpose, the bellows wall adjoining the sealing plate is more rigid than the wall area adjoining the flanged portion. The bellows therefore tapers in a direction toward the sealing plate and, at its junction with the more rigid wall, defines a constriction. This more rigid wall may be effected in a simple manner as by making it thicker than the remaining wall portion.

The outlet openings for the flow may be provided in the area of the bellows adjoining the sealing plate, i.e., in the wall area having greater rigidity. In addition, the area of the bellows adjoining the sealing plate is provided with reinforcements lying between the outlet openings. If, therefore, for example, four outlet openings for the flow have been provided in the bellows at the same axial level, then these reinforcements form a cross viewed from the top.

The flanged member is profiled at its side facing the sealing plate as to receive such plate in a closed condition. The sealing plate will be therefore at least partially within the flanged portion, the surface areas of these two parts in contact with one another being so designed that they will assure a perfect seal.

For this purpose at least one of the two parts may be provided with at least one circular groove for the reception of circular lips on the other, such lips being provided with projections to form tight seats. These projections likewise are made of flexible material and, in the closed condition of the locking arrangement, they press each time in such a way against the other part of the surface part opposing them that an effective seal will be assured.

FIG. 1 is a vertical sectional view of the locking arrangement in accordance with the invention showing an open position at the left and a closed position thereof at the right;

FIG. 2 is a top view of the locking arrangement shown in FIG. 1; and

FIG. 3, on a smaller scale, is a side view of the locking arrangement.

Turning now to the drawings wherein like reference characters refer to like and corresponding parts throughout the several views, there is shown the three main parts of the arrangement including a flanged portion 1 having at its inner circumference a cylindrical bellows 2 consisting of flexible material and a sealing plate 3 interconnected by the bellows with its outermost end facing away from the flanged portion 1. It should be noted, however, that these parts may be produced in a single operation and may constitute a one-piece locking arrangement.

At the left of the centerline in FIG. 1 the open condition of the arrangement is shown wherein the bellows forms a single cylinder interconnected at one end with flanged portion 1 along its inner periphery at front side 4 which faces away from sealing plate 3. The bellows is interconnected at its other end to sealing plate 3 inside the outer circumference thereof. In the open condition of the locking arrangement, therefore, bellows 2 is disposed wholly within flanged portion 1. Such is important for the sealing of the locking arrangement in its closed state, which is to be explained hereinafter.

The bellows 2 comprises a relatively thin walled portion 6 at its interconnection with flanged portion 1, and a thicker, more rigid wall portion 7 at its interconnection with sealing plate 3. This greater rigidity for wall portion 7 is enhanced by intersecting reinforcements 8 and 9, shown clearly in FIG. 2. These reinforcements 8 and 9 lie between adjacent flow openings 10, 11, 12 and 13. Reinforcement 9 is extended to form an operating lever 14 which lies within bellows 2 and extends outwardly beyond the flanged portion 1 during the opened condition. By pulling on handle 14, therefore, the locking arrangement may be moved into a closed position, as shown at the right of the centerline in FIG. 1, and by pressing against sealing plate 3 through handle 14, the arrangement may be moved into an open position.

In the open position of the locking arrangement, therefore, bellows 2 and the four flow openings 10 through 13 define flow paths in its wall portion 7 for a liquid or gas medium either collected in a container, for example, or lying behind a floorboard 15 of a motor vehicle in the opening of which the flanged portion 1 has been snapped in by means of a circular groove in cooperation with flange 16 of the floorboard.

Also, it can be seen that the diameter of wall portion 6 of the bellows is greater than the wall portion 7 diameter thereby defining, in the open lock position, a constriction 17 at the junction between the wall portions with the former converging toward the latter. This constriction together with the greater rigidity of wall portion 7 permits a tight closure of the locking arrangement without interference by the bellows. As noted above, the transition from the open position (left half of FIG. 1) into the closed position (right half of FIG. 1) of the locking arrangement is accomplished by a pulling on the handle 14 as a result of which sealing plate 3 with its outer peripheral area is brought into close contact with the inner circumferential area of flanged portion 1. In this closed position, bellows 2 has been deformed into a double cylinder configuration in such a way that the more rigid wall portion 7 is surrounded by the more flexible wall portion, the two wall portions being interconnected at that end which in the closed state of the arrangement faces away from sealing plate 3 and flanged portion 1. Accordingly, flow openings 10 through 13 are completely covered up by the sealing arrangement in its closed condition.

In order to assure an effective seal in the closed condition, both the flanged portion 1 and the sealing plate 3 are respectively provided with circular sealing lips 19 and 18 behind each of which is located a circular groove 20 and 21. Such grooves are each defined respectively by projections 22 and 23.

A peripheral flange 25 is provided at the outer side of sealing plate 3, as clearly shown in FIG. 1, to thereby serve as a stop for the sealing plate in its closed position. Also, a sealing lip 24 is provided on flange 25 to further seal the parts 1 and 3 upon closing as the flange 25 and lip 24 are made to cooperate with a circular cutout portion in the base of portion 1, as shown to the right of the centerline in FIG. 1.

From the foregoing it can be seen that an effective yet simple locking arrangement has been devised in which a sealing plate 3 may be both locked in place and sealed to flanged portion 1 upon closing. Flow through the arrangement is easily effected by manually depressing handle 14 to thereby break the seal and move sealing plate 3 and bellows 2 outwardly of portion 1. It should be further pointed out, however, that the sealing plate may also be opened automatically whenever a liquid or gas pressure bearing on upper side 5 of sealing plate 3 exceeds a predetermined level. The operating handle, in such case, may therefore be eliminated if desired.

Obviously, many modifications and variations of the present invention are possible in the light of the above teachings. It is therefore to be understood that within the scope of the appended claims the invention may be practiced otherwise than as specifically described.

What is claimed is:

1. A closure valve of flexible material for closing an opening in a plate member, especially the floor plate of a motor vehicle, comprising: a flanged portion having an outer peripheral wall, an inner peripheral wall defining a closable opening, and a front side wall extending between said peripheral walls, an outwardly open groove in said outer peripheral wall for tight engagement with the rim of said plate member opening; a cylindrical bellows for closing said closable opening being secured at one end to said inner peripheral wall at said front side wall and extending through said flanged portion, a sealing plate having an outer peripheral wall at the other end of said bellows, outlet openings in said bellows to permit axial flow through the valve; an inwardly extending sealing lip having sealing seat projections thereon and an inwardly open sealing groove on said flanged portion inner peripheral wall; an outwardly extending sealing lip and an outwardly open sealing groove on said sealing plate outer peripheral wall, said inwardly extending sealing lip lying within said outwardly extending groove and said outwardly extending groove and said outwardly extending sealing lip lying within said inwardly extending groove upon movement of said sealing plate into sealing engagement with said inner peripheral wall for completely sealing said closable opening, the wall of said bellows being folded over on itself during said sealing engagement.

2. The arrangement according to claim 1 wherein said flanged portion, bellows and sealing plate constitute a single part.

3. The arrangement according to claim 2 wherein one portion of said bellows wall decreases in diameter from said one end toward said other end thereby facilitating the folding over of said bellows on itself.

4. The arrangement according to claim 3 wherein another portion of said bellows wall at said other end thereof is more rigid than said one wall portion thereby additionally facilitating the folding over of said bellows on itself.

5. The arrangement according to claim 4 wherein the cross-section of said another wall portion decreases in diameter from said other end toward said one end so as to constitute a constriction at the junction between said one and said another bellows wall portions.

6. The arrangement according to claim 5 wherein said another more rigid wall portion has a thicker wall as compared to said one wall portion.

7. The arrangement according to claim 6 wherein said outlet openings are provided in said another more rigid wall portion.

8. The arrangement according to claim 7 wherein said another more rigid wall portion is provided with reinforcements disposed between adjacent ones of said outlet openings.

9. The arrangement according to claim 1 wherein an operating handle is secured to said sealing plate and is disposed within said bellows and projects in an axial direction outwardly of said flanged portion.

10. The arrangement according to claim 9 wherein said operating handle is integral with said sealing plate.

11. The arrangement according to claim 1 wherein said sealing plate is provided with a circumferential projection to thereby prevent said sealing plate from being pulled through said flanged portion upon being sealed therewith.

References Cited

UNITED STATES PATENTS

| 2,926,686 | 3/1960 | Gheen | 251—145 X |
| 2,946,342 | 7/1960 | Dopplmaier | 251—145 X |
| 2,746,651 | 5/1956 | Lewis | 222—528 X |
| 2,343,584 | 3/1944 | Scheele | 251—331 |
| 2,663,467 | 12/1953 | Dooglass et al. | 222—528 X |
| 3,547,401 | 12/1970 | Beall | 251—342 X |

WILLIAM R. CLINE, Primary Examiner

U.S. Cl. X.R.

251—144, 145; 222—528